US009915996B2

(12) United States Patent
Noro

(10) Patent No.: US 9,915,996 B2
(45) Date of Patent: Mar. 13, 2018

(54) METHOD OF CONTROLLING PROCESSOR, INFORMATION PROCESSING APPARATUS, AND NON-TRANSITORY COMPUTER-READABLE STORAGE MEDIUM

(71) Applicant: FUJITSU LIMITED, Kawasaki-shi, Kanagawa (JP)

(72) Inventor: Masaaki Noro, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 198 days.

(21) Appl. No.: 14/317,231

(22) Filed: Jun. 27, 2014

(65) Prior Publication Data

US 2015/0058647 A1 Feb. 26, 2015

(30) Foreign Application Priority Data

Aug. 23, 2013 (JP) .................................. 2013-173226

(51) Int. Cl.
*G06F 1/32* (2006.01)
(52) U.S. Cl.
CPC .......... *G06F 1/3228* (2013.01); *G06F 1/3243* (2013.01); *Y02B 60/1239* (2013.01); *Y02B 60/32* (2013.01)
(58) Field of Classification Search
CPC . G06F 1/3228; G06F 1/3243; Y02B 60/1239; Y02B 60/32
See application file for complete search history.

(56) References Cited

U.S. PATENT DOCUMENTS 6,829,493 B1  12/2004  Hunzinger
7,256,788 B1 * 8/2007  Luu ........................ G06F 1/3203
                                                              345/211

(Continued)

FOREIGN PATENT DOCUMENTS

JP    2001-358647    12/2001
JP    2009-532999    9/2009

(Continued)

OTHER PUBLICATIONS

Office Action dated Mar. 14, 2017 in Japanese Patent Application No. 2013-173226 (with machine generated English translation).

*Primary Examiner* — Thomas Lee
*Assistant Examiner* — Mohammad A Rahman
(74) *Attorney, Agent, or Firm* — Oblon, McClelland, Maier & Neustadt, L.L.P.

(57) ABSTRACT

A method of controlling a processor includes determining an operational mode of the processor in a time period and an operational frequency of the processor in second data processing based on a completion deadline of the second data processing and an amount of data processing in the second data processing which is performed by the processor after first data processing is completed by the processor, the time period being from completion of the first data processing to start of the second data processing, controlling the processor in the determined operational mode after the first data processing is completed by the processor, and performing the second data processing using the processor that operates with the determined operational frequency after the controlling of the processor in the operational mode.

20 Claims, 17 Drawing Sheets

(56) References Cited

U.S. PATENT DOCUMENTS

| | | | | |
|---|---|---|---|---|
| 7,577,763 B1* | 8/2009 | Beaman | G06F 3/061 | 710/6 |
| 8,032,891 B2* | 10/2011 | Chauvel | G06F 1/3228 | 713/320 |
| 8,127,166 B1* | 2/2012 | Swift | G06F 1/3206 | 711/112 |
| 8,489,904 B2* | 7/2013 | Boyd | G06F 1/3203 | 713/320 |
| 8,527,997 B2* | 9/2013 | Bell, Jr. | G06F 9/5094 | 713/320 |
| 9,195,499 B2* | 11/2015 | Barillari | G06F 9/4843 | |
| 2005/0223249 A1* | 10/2005 | Samson | G06F 1/3228 | 713/320 |
| 2006/0271801 A1* | 11/2006 | Kano | G06F 1/3203 | 713/300 |
| 2007/0168055 A1* | 7/2007 | Hsu | G06F 1/3203 | 700/32 |
| 2007/0290727 A1 | 12/2007 | Jarosinski et al. | | |
| 2008/0141265 A1* | 6/2008 | Choi | G06F 1/3203 | 718/105 |
| 2008/0158574 A1* | 7/2008 | Sugiyama | H04N 1/00885 | 358/1.1 |
| 2008/0168219 A1* | 7/2008 | Molaro | G06F 11/1435 | 711/112 |
| 2008/0271035 A1* | 10/2008 | Yasukawa | G06F 1/3203 | 718/104 |
| 2010/0287396 A1* | 11/2010 | Barth | G06F 1/3228 | 713/323 |
| 2011/0093734 A1* | 4/2011 | Burchard | G06F 1/3203 | 713/340 |
| 2011/0154079 A1* | 6/2011 | Dixon | G06F 1/3203 | 713/323 |
| 2012/0072919 A1* | 3/2012 | Salsbery | G06F 1/3203 | 718/105 |
| 2013/0097445 A1* | 4/2013 | Palaniappan | G06F 1/3275 | 713/323 |
| 2013/0138985 A1* | 5/2013 | Wang | G06F 1/3234 | 713/320 |
| 2013/0198540 A1* | 8/2013 | Lee | G06F 1/32 | 713/320 |
| 2013/0262902 A1* | 10/2013 | Herdrich | G06F 9/5094 | 713/323 |
| 2014/0101420 A1* | 4/2014 | Wu | G06F 1/3206 | 713/1 |
| 2014/0181553 A1* | 6/2014 | Eckert | G06F 1/3234 | 713/323 |
| 2014/0181556 A1* | 6/2014 | Eckert | G06F 1/324 | 713/323 |
| 2014/0184619 A1* | 7/2014 | Kim | G06T 1/20 | 345/519 |
| 2014/0222229 A1 | 8/2014 | Teranishi et al. | | |
| 2014/0289546 A1* | 9/2014 | Min | G06F 1/3228 | 713/323 |
| 2015/0026493 A1* | 1/2015 | Kim | G06F 1/3275 | 713/320 |
| 2015/0039922 A1* | 2/2015 | Chalhoub | G06F 1/3234 | 713/323 |

FOREIGN PATENT DOCUMENTS

| | | |
|---|---|---|
| JP | 2012-063988 | 3/2012 |
| JP | 2013-012003 A | 1/2013 |
| WO | 2013/073013 A1 | 5/2013 |

* cited by examiner

FIG. 3

| POWER SAVING STATE | MINIMUM QoS TIME |
|---|---|
| ACTIVE STANDBY STATE $S_1$ | $t_q^{mim(s1)}$ |
| ACTIVE STANDBY STATE $S_2$ | $t_q^{mim(s2)}$ |
| — | — |

FIG. 7

| FREQUENCY | POWER CONSUMPTION |
|---|---|
| $f_1$ | $p_{f1}$ |
| $f_2$ | $p_{f2}$ |
| – | – |

FIG. 8

| POWER SAVING STATE | POWER CONSUMPTION |
|---|---|
| ACTIVE STANDBY STATE $S_1$ | $p_{s1}$ |
| SLEEP STATE $S_2$ | $p_{s2}$ |
| – | – |

METHOD OF CONTROLLING PROCESSOR, INFORMATION PROCESSING APPARATUS, AND NON-TRANSITORY COMPUTER-READABLE STORAGE MEDIUM

CROSS-REFERENCE TO RELATED APPLICATION

This application is based upon and claims the benefit of priority from the prior Japanese Patent Application No. 2013-173226 filed on Aug. 23, 2013, the entire contents of which are incorporated herein by reference.

FIELD

The technology of the present disclosure relates to a method of controlling a processor, an information processing apparatus, and a non-transitory computer-readable storage medium.

BACKGROUND

For example, a technology has been developed that reduces the power consumption of a Central Processing Unit (CPU) by causing a transition of the CPU from an active state to a power saving state when there is no subsequent processing to be performed by the CPU in an information processing apparatus such as a smart phone. The reference documents of related art include Japanese National Publication of International Patent Application No. 2009-532999.

SUMMARY

According to an aspect of the invention, a method of controlling a processor includes determining an operational mode of the processor in a time period and an operational frequency of the processor in second data processing based on a completion deadline of the second data processing and an amount of data processing in the second data processing which is performed by the processor after first data processing is completed by the processor, the time period being from completion of the first data processing to start of the second data processing, controlling the processor in the determined operational mode after the first data processing is completed by the processor, and performing the second data processing using the processor that operates with the determined operational frequency after the controlling of the processor in the operational mode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a schematic diagram of a minimum QoS time table according to the first embodiment;

FIG. 7 is a schematic diagram of a frequency to power consumption table according to the second embodiment;

FIG. 8 is a schematic diagram of a power saving state to power consumption table according to the second embodiment;

DESCRIPTION OF EMBODIMENTS

Figure 1:
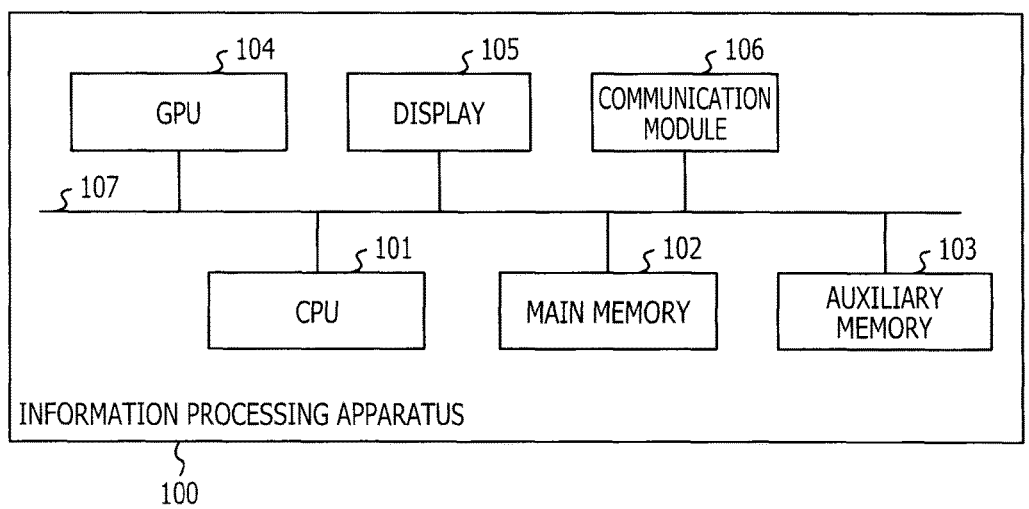
FIG. 1 is a schematic diagram of a hardware configuration of an information processing apparatus according to a first embodiment.

When a CPU returns from a power saving state to an active state, a great amount of current flows through the CPU, and therefore the power consumption of the CPU increases significantly. Thus, when a set period of a power saving state is shorter, the power consumption of the CPU increases accordingly in the entire cycle of transition from an active state to a power saving state and return from the power saving state to an active state. Consequently, in the related art, whether or not a CPU is caused to make a transition from an active state to a power saving state is determined based on ensured length of set period of a power saving state. When multiple power saving states are provided, a power saving state as a transition destination is determined based on the ensured length of set period for each of the power saving states. However, it is not possible to reduce the power consumption of the CPU sufficiently by the related art.

The embodiment according to the present disclosure provides a method for controlling a CPU, a program for controlling the CPU, and an information processing apparatus that are capable of reducing the power consumption of the CPU sufficiently.

In the following embodiments, it is assumed that after return from a power saving state to an active state, the next processing to be performed by the CPU is ready, and after the next processing is performed, the CPU makes a transition to a power saving state again. In such a case, in order to reduce the amount of power consumption of the CPU, it is desired to reduce the total of the power consumption in the duration since a transition to a power saving state until return to an active state and the power consumption for the next processing. However, the amount of power consumption in the duration since a transition to a power saving state until return to an active state varies according to the power saving state as a transition destination. In addition, the amount of power consumption for the next processing varies according to the frequency used by the CPU.

Thus, in the present embodiment, a combination of the power saving state as a transition destination and the frequency to be used is selected so as to reduce the total amount of power consumption of the CPU. However, a combination of the power saving state as a transition destination and the frequency to be used may not be determined without restrictions. For example, when a completion deadline has been set for the next processing, simply reducing the frequency to be used may cause a failure to meet the completion deadline for the next processing. When a transition is made to a power saving state having a minimum power consumption, it takes too much time for the transition to the power saving state and return to an active state, and thus the start time of the next processing may be delayed, which may cause a failure to meet the completion deadline for the next processing. In the present embodiment, optimal power saving state and frequency are selected while satisfying those conditions.

First Embodiment

Hereinafter, a first embodiment will be described with reference to FIGS. 1 to 5.

In the present embodiment, a power saving state as a transition destination of the CPU 101 and a frequency used in processing are determined based on the amount of power consumption in the duration since a transition to a power saving state which may be assumed by CPU 101 until return to an active state of the CPU 101, the amount of processing performed by the CPU 101 after return to an active state, and the frequency usable by the CPU 101 after return to an active state. For this reason, it is possible to use optimal power saving state and frequency which allow the power consumption of the CPU 101 to be reduced.

[Hardware of Information Processing Apparatus 100]

FIG. 1 is a schematic diagram of a hardware configuration of an information processing apparatus 100 according to the first embodiment. In the present embodiment, the information processing apparatus 100 is assumed to be a portable information processing apparatus such as a smart phone or a tablet PC, for example.

As illustrated in FIG. 1, the information processing apparatus 100 includes the CPU 101, a main memory 102, an auxiliary memory 103, a GPU 104, a display 105, and a communication module 106 as hardware modules. These hardware modules are interconnected via a bus 107.

The CPU 101 reads various programs stored in the auxiliary memory 103 into the main memory 102 via the bus 107, and executes the read various programs in the main memory 102, thereby achieving various functions. The details of the various functions will be described later.

The main memory 102 stores various programs to be executed by the CPU 101. In addition, the main memory 102 is used as a work area for the CPU 101 and stores various data to be used for processing by the CPU 101. For example, a random access memory (RAM) may be used as the main memory 102.

The auxiliary memory 103 stores various programs that cause the information processing apparatus 100 to be operated. In addition to application programs to be executed by the information processing apparatus 100, for example, an operating system (OS) which is the execution environment for the application program is included in the various programs. A control program according to the present embodiment is also stored in the auxiliary memory 103. A nonvolatile memory such as a hard disk or a flash memory may be used as the auxiliary memory 103.

The GPU 104 is controlled by the CPU 101 and generates drawing data to be displayed on the display 105. In addition, the GPU 104 acquires a control right of the bus 107, and stores the generated drawing data into a video random access memory (VRAM). After the drawing data is generated, the GPU 104 transmits an interrupt signal to the CPU 101.

The display 105 displays the drawing data stored in the VRAM. The communication module 106 is controlled by the CPU 101, and performs various communications in addition to transmission and reception of, for example, e-mails, and twitter messages.

[Functional Block of Information Processing Apparatus 100]

Figure 2:
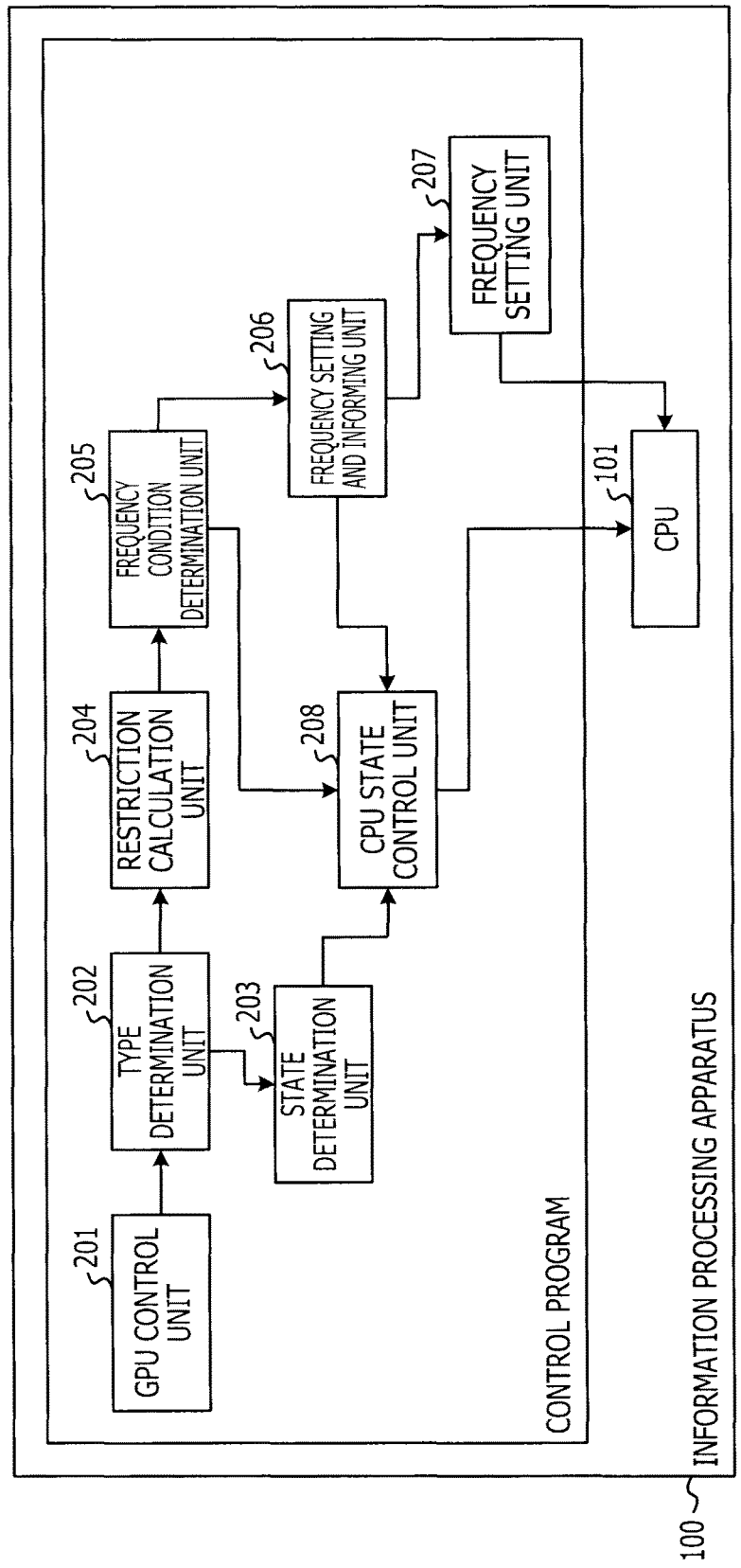
FIG. 2 is a schematic diagram of a functional block of the information processing apparatus according to the first embodiment.

FIG. 2 is a schematic diagram of a functional block of the information processing apparatus 100 according to the first embodiment.

As illustrated in FIG. 2, the information processing apparatus 100 includes a GPU control unit 201, a type determination unit 202, a state determination unit 203, a restriction calculation unit 204, a frequency condition determination unit 205, a frequency setting and informing unit 206, a frequency setting unit 207, and a CPU state control unit 208. Furthermore, the main memory 102 or the auxiliary memory 103 according to the first embodiment holds a minimum QoS time table T1.

The operation of each of the GPU control unit 201, the type determination unit 202, the state determination unit 203, the restriction calculation unit 204, the frequency condition determination unit 205, the frequency setting and informing unit 206, the frequency setting unit 207, and the CPU state control unit 208 is achieved by the CPU 101 that reads a control program in the main memory 102 and executes the control program read therein.

The GPU control unit 201 commands the GPU 104 to execute processing, for example, drawing processing based on a command from the CPU 101. In addition, the GPU control unit 201 informs the type determination unit 202 of a QoS request. The QoS request includes at least the type of the processing to be performed by the GPU 104 and a QoS time $t_q$ for the type. Furthermore, the GPU control unit 201 receives an interrupt signal from the GPU 104.

The type determination unit 202 determines whether or not a completion deadline is set for the next processing of the CPU 101 based on the type of the processing informed by the GPU control unit 201.

The state determination unit 203 determines a power saving state S as a transition destination of the CPU 101 based on a QoS time $t_q$ from the GPU control unit 201. As the power saving state S, for example, an active standby state or a sleep state may be used.

The restriction calculation unit 204 calculates a CPU processing time $t_L^f$ for each frequency f of the CPU 101. The CPU processing time $t_L^f$ is the time taken for the next processing when the frequency f is set for the CPU 101. In addition, the restriction calculation unit 204 calculates a CPU completion deadline $t_{deadline}$ based on a scheduled time for screen update and a time taken for drawing processing. The CPU completion deadline $t_{deadline}$ is a deadline by which the next processing of the CPU 101 has to be terminated in order to complete drawing processing of the GPU 104 by the schedule time for screen update.

The frequency condition determination unit 205 acquires a minimum QoS time $t_q^{min}$ from the minimum QoS time table T1 for each power saving state S. The minimum QoS time $t_q^{min}$ is the shortest time which allows the power consumption of the CPU 101 to be reduced when the CPU 101 is caused to make a transition from an active state to one of power saving states S. In addition, the frequency condition determination unit 205 selects a minimum frequency $f_{min}$ for each power saving state S. The minimum frequency $f_{min}$ is a minimum value of frequency which allows the next processing of the CPU 101 to be completed within a time limit T. The time limit T is the time period from the current time to the CPU completion deadline $t_{deadline}$. Furthermore, the frequency condition determination unit 205 selects one of combinations of a power saving state S and a corresponding minimum frequency $f_{min}$, the combination providing a minimum total power consumption of the CPU 101.

The frequency setting informing unit 206 sets a minimum frequency $f_{min}$ in the frequency setting unit 207 as a return frequency of the CPU 101, the minimum frequency $f_{min}$ being from the frequency condition determination unit 205. The return frequency is a frequency that is used by the CPU 101 immediately after return to an active state from a power saving state. In addition, setting of a minimum frequency $f_{min}$ in the frequency setting unit 207 triggers the frequency setting informing unit 206 to inform the CPU state control unit 208 of completion of frequency setting.

The frequency setting unit 207 holds a frequency of the CPU 101. The CPU 101 uses a frequency held in the frequency setting unit 207 to perform various processing.

The CPU state control unit 208 sets the CPU 101 in an active state or one of power saving states S, which is determined by the state determination unit 203.

[Minimum QoS Time Table T1]

FIG. 3 is a schematic diagram of a minimum QoS time table T according to the first embodiment.

As illustrated in FIG. 3, the minimum QoS time table T1 stores a minimum QoS time for each of the types (levels) of the power saving states of the CPU 101. The minimum QoS time is a minimum time which allows the power consumption of the CPU 101 to be reduced when the CPU 101 is caused to make a transition from an active state to one (an active standby state or a sleep state) of power saving states and the CPU 101 further returns to an active state. In the minimum QoS time table T1 according to the present embodiment, an active standby state $S_1$ is associated with $t_q^{min(s1)}$ as a minimum QoS time, and a sleep state $S_2$ is associated with $t_q^{min(s2)}$ as a minimum QoS time.

That is, in the case where the CPU 101 is caused to make a transition from an active state to an active standby state and the CPU 101 is further caused to return to an active state, when the set period of an active standby state exceeds the $t_q^{min(s1)}$, the power consumption of the CPU 101 may be reduced. Similarly, in the case where the CPU 101 is caused to make a transition from an active state to a sleep state and the CPU 101 is further caused to return to an active state, when the set period of a sleep state exceeds the $t_q^{min(s2)}$, the power consumption of the CPU 101 may be reduced.

[Outline of Transition Processing]

Figure 4:
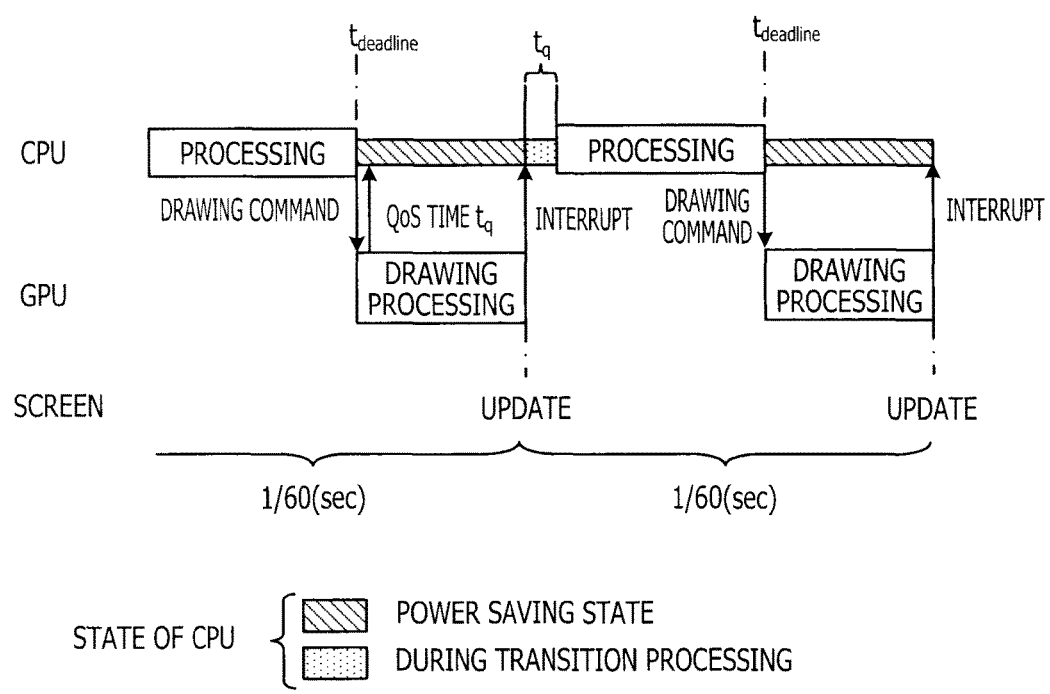
FIG. 4 is a schematic diagram of transition processing according to the first embodiment.

FIG. 4 is a schematic diagram of transition processing according to the first embodiment.

In the present embodiment, the transition processing to a power saving state will be described by way of illustration of updating the screen of the information processing apparatus 100.

As illustrated in FIG. 4, in updating the screen of the information processing apparatus 100, the GPU 104 informs the CPU 101 of a QoS time $t_q$ based on a drawing command from the CPU 101, the QoS time $t_q$ being associated with the drawing command. In addition, based on the drawing command from the CPU 101, the GPU 104 starts drawing processing, that is, generation of drawing data to be displayed on the information processing apparatus 100. After completing the drawing processing, the GPU 104 writes the drawing data into the VRAM and transmits an interrupt signal to the CPU 101. The interrupt signal is for informing that the drawing processing of the GPU 104 is completed.

On the other hand, the CPU 101, after issuing a drawing command to the GPU 104, makes a transition to a power saving state. The power saving state is, for example, an active standby state or a sleep state. The CPU 101 in a power saving state returns to an active state based on an interrupt signal from the GPU 104 to perform post-processing of the last drawing processing of the GPU 104 and pre-processing of the subsequent next drawing processing. At this point, in order to ensure QoS, the CPU 101, after receiving an interrupt signal, starts the post-processing of the last drawing processing before the QoS time $t_q$ elapses. Thus, the CPU 101 is able to complete the post-processing of the last drawing processing and the pre-processing of the next drawing processing by the CPU completion deadline $t_{deadline}$. The CPU completion deadline $t_{deadline}$ is a deadline by which the post-processing and pre-processing of the CPU 101 have to be completed in order to complete the subsequent drawing processing of the GPU 104 before the next screen update. Thus, the GPU 104 is able to complete the drawing processing before the next screen update.

The post-processing includes, for example, transfer of drawing data to the display 105, and generation of a command to the GPU 104 to make a transition to a power saving state, the drawing data being generated by the GPU 104. The pre-processing includes, for example, generation of a drawing command to the GPU 104.

The display 105 updates the screen based on the drawing data written in the VRAM every ¹⁄₆₀ seconds, for example.

[Transition Processing Flow]

Figure 5:
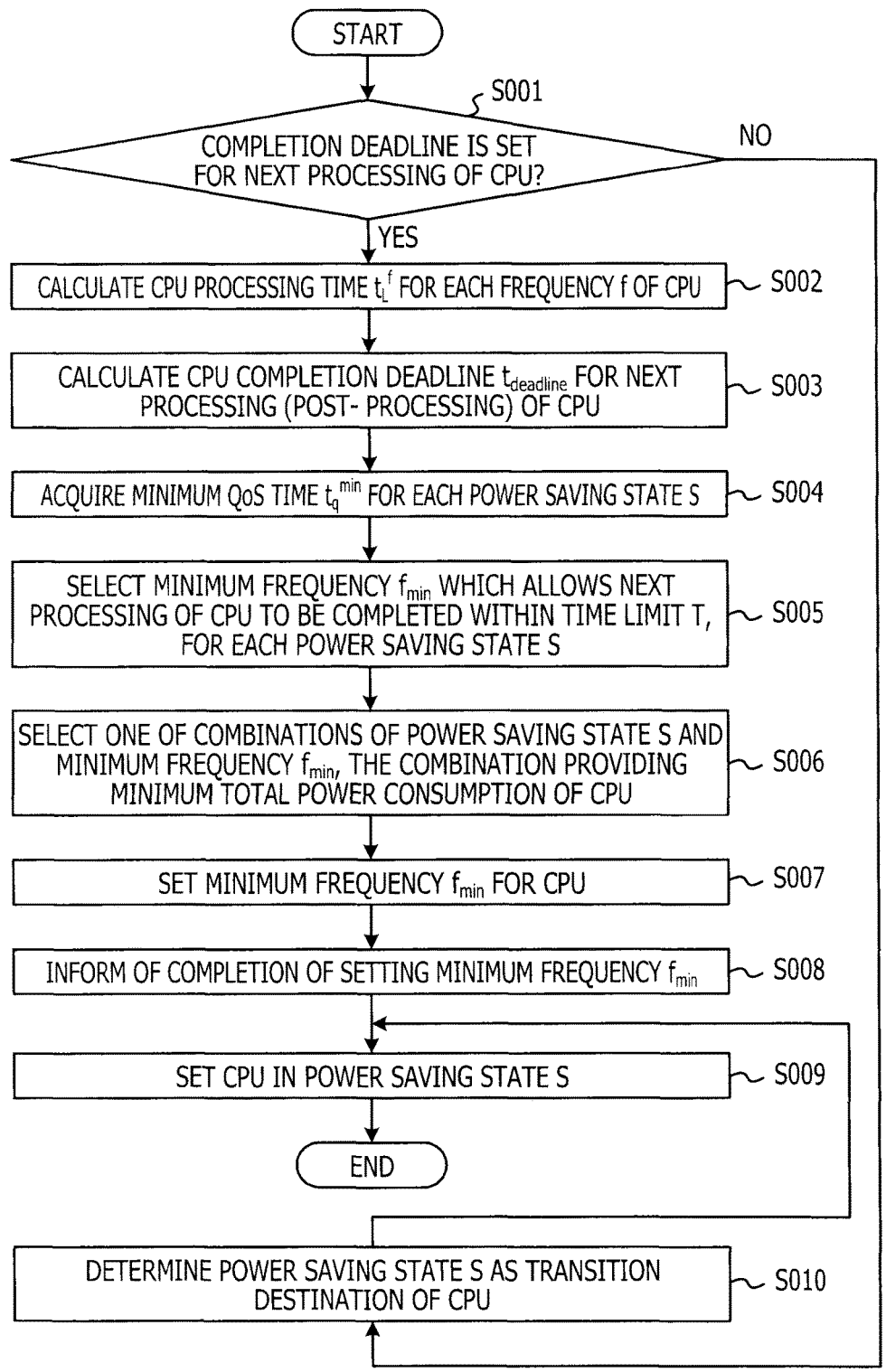
FIG. 5 is a flow chart for the transition processing according to the first embodiment.

FIG. 5 is a flow chart for transition processing according to the first embodiment.

As illustrated in FIG. 5, the type determination unit 202 determines whether or not a completion deadline has been set for the next processing of the CPU 101, based on a type of processing from the GPU control unit 201 (step S001). The next processing includes pre-processing and post-processing. The post-processing includes, for example, transfer of drawing data to the display 105, and generation of a command to the GPU 104 to make a transition to a power saving state, the drawing data being generated by the GPU 104. The pre-processing includes, for example, generation of a drawing command to the GPU 104.

When it is determined that a completion deadline has not been set (No in step S001), the state determination unit 203 determines a power saving state S as a transition destination of the CPU 101 based on a QoS time $t_q$ from the GPU control unit 201 (step S010).

Next, the CPU state control unit 208 sets the CPU 101 in the power saving state S which has been determined by the state determination unit 203 (step S009).

On the other hand, when it is determined that a completion deadline has been set (Yes in step S001), the restriction calculation unit 204 calculates a CPU processing time $t_L^f$ for each frequency f of the CPU 101 (step S002). Here, a frequency f is used which is higher than the current frequency of the CPU 101 and which may be set for the CPU 101. The CPU processing time $t_L^f$ is a time taken for the next processing of the CPU 101. Specifically, the restriction calculation unit 204 determines a CPU processing time $t_L^f$ by dividing a processing amount L for the next processing of the CPU 101 by the frequency f.

Next, the restriction calculation unit 204 calculates a completion deadline for the next processing of the CPU 101, that is, a CPU completion deadline $t_{deadline}$ based on a scheduled time for screen update and a time taken for drawing processing (step S003). The CPU completion deadline $t_{deadline}$ is a deadline by which the next processing of the CPU 101 has to be completed in order to complete drawing processing of the GPU 104 by the scheduled time for screen update.

Next, the frequency condition determination unit 205 refers to the minimum QoS time table T1 to acquire a minimum QoS time $t_q^{min}$ for each power saving state S (step S004). The minimum QoS time $t_q^{min}$ is the shortest time which allows the power consumption of the CPU 101 to be reduced when the CPU 101 is caused to make a transition from an active state to one of power saving states S.

Next, the frequency condition determination unit 205 selects a minimum frequency $f_{min}$ for each power saving state S (step S005). The minimum frequency $f_{min}$ is a minimum value of frequency which allows the next processing of the CPU 101 to be completed within the time period from the current time to the CPU completion deadline $t_{deadline}$, that is, within the time limit T. That is, the frequency condition determination unit 205 generates a combination of a power saving state S and a corresponding minimum frequency $f_{min}$. Specifically, the frequency condition determination unit 205 calculates the time limit T from the current time to the CPU completion deadline $t_{deadline}$ based on a scheduled time for screen update and a time taken for drawing processing. Subsequently, the frequency condition determination unit 205 selects a minimum value of frequency f for which the total of the CPU processing time $t_L^f$ and the minimum QoS time $t_q^{min}$ is less than or equal to the time limit T.

Next, the frequency condition determination unit 205 selects one of combinations of a power saving state S and a minimum frequency $f_{min}$, the combination providing a minimum total power consumption of the CPU 101 (step S006). In the present embodiment, the total power consumption of the CPU 101 is considered to be a minimum when the frequency f for which the CPU 101 performs the next processing, that is, the frequency f of the CPU processing time $t_L^f$ is the lowest. Thus, the frequency condition determination unit 205 selects one of combinations of a power saving state S and a minimum frequency $f_{min}$, the combination providing a least minimum frequency $f_{min}$. In addition, the frequency condition determination unit 205 informs the frequency setting informing unit 206 and the CPU state control unit 208 of the selected combination of the power saving state S and the minimum frequency $f_{min}$.

Next, the frequency setting informing unit 206 sets a minimum frequency $f_{min}$ in the frequency setting unit 207 as a return frequency of the CPU 101, the minimum frequency $f_{min}$ being from the frequency condition determination unit 205 (step S007). After return to an active state, the CPU 101 uses the minimum frequency $f_{min}$ which has been set in the frequency setting unit 207.

Next, the frequency setting informing unit 206 informs the CPU state control unit 208 of completion of frequency setting (step S008).

Next, the informing of completion of frequency setting by the frequency setting informing unit 206 triggers the CPU state control unit 208 to set the CPU 101 in the power saving state S which is selected by the frequency condition determination unit 205 (step S009). In this manner, the transition processing is completed.

As described above, the frequency condition determination unit 202 according to the present embodiment selects a combination of a power saving state S and a minimum frequency $f_{min}$, the power saving state S being a transition destination of the CPU 101, the minimum frequency $f_{min}$ being to be used after return to an active state, the combination providing a minimum total power consumption of the CPU 101. Therefore, even when the CPU 101 makes a transition to a power saving state S, the power consumption of the CPU 101 may be reduced.

Furthermore, the frequency setting unit 205 according to the present embodiment sets for the CPU 101 a minimum value of frequency, that is, the minimum frequency $f_{min}$, the minimum value of frequency allowing the next processing of the CPU 101 to be completed by the CPU completion deadline $t_{deadline}$. Consequently, the GPU 104 is able to update the screen reliably at a scheduled time.

Second Embodiment

Hereinafter, a second embodiment will be described with reference to FIGS. 6 to 9. However, description of the same configurations, functions, operations as those in the first embodiment is omitted.

In the first embodiment, a combination of a power saving state S and a minimum frequency $f_{min}$ is selected under the assumption that the total power consumption of the CPU 101 is considered to be a minimum when the frequency f for which the CPU 101 performs the next processing, that is, the frequency f of the CPU processing time $t_L^f$ is the lowest. That is, a combination providing a minimum total power consumption of the CPU 101 is selected based on only the power consumption by the CPU 101 in performing the next processing.

On the other hand, in the second embodiment, a combination providing a minimum total power consumption of the CPU 101 is selected in consideration of not only the power consumption by the CPU 101 in performing the next processing, but also the power consumption during a set period of a power saving state S.

[Functional Block of Information Processing Apparatus 100A]

Figure 6:
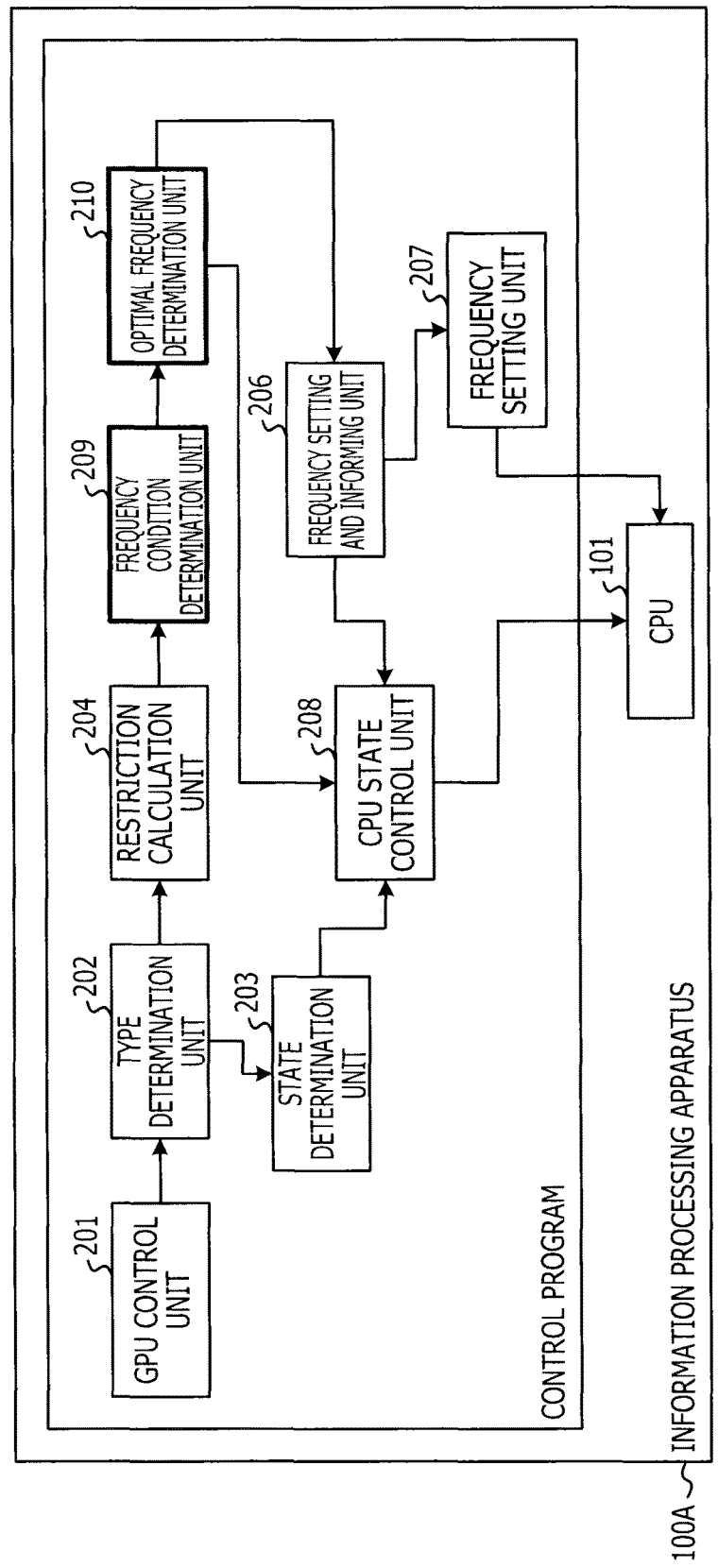
FIG. 6 is a schematic diagram of a functional block of an information processing apparatus according to a second embodiment.

FIG. 6 is a schematic diagram of a functional block of an information processing apparatus 100A according to the second embodiment.

As illustrated in FIG. 6, the information processing apparatus 100A according to the second embodiment includes a frequency condition determination unit 209 instead of the frequency condition determination unit 205 according to the first embodiment, and further includes an optimal frequency determination unit 210. In addition, a main memory 102 or an auxiliary memory 103 according to the second embodiment holds a frequency to power consumption table T2 and a power saving state to power consumption table T3.

The operation of each of the frequency condition determination unit 209 and the optimal frequency determination unit 210 is achieved by the CPU 101 that reads a control program in the main memory 102 and executes the control program read therein.

The frequency condition determination unit 209 informs the optimal frequency determination unit 209 of all combinations of a power saving state S and a minimum frequency $f_{min}$. That is, in contrast to the frequency condition determination unit 205 according to the first embodiment, the frequency condition determination units 209 according to the present embodiment does not select a combination that provides a minimum total power consumption of the CPU 101.

The optimal frequency determination unit 210 selects one of combinations of a power saving state S and a minimum frequency $f_{min}$ which are informed by the frequency condition determination unit 209, the combination providing a minimum total power consumption of the CPU 101. Specifically, the optimal frequency determination unit 210 according to the present embodiment selects a combination for which the power consumption by the CPU 101 in performing the next processing, that is, the power consumption during the CPU processing time $t_L^f$ and the power consumption during a set period $t_q^{min}$ of a power saving state S has a minimum total. In addition, the optimal frequency determination unit 210 informs the CPU state control unit 208 and the frequency setting informing unit 206 of a combination of the power saving state S and the minimum frequency $f_{min}$, the combination providing a minimum total power consumption.

[Frequency to Power Consumption Table T2]

Figure 7:
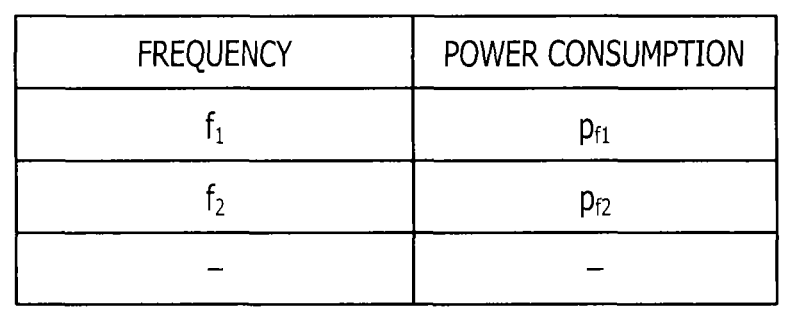

FIG. 7 is a schematic diagram of a frequency to power consumption table T2 according to the second embodiment.

As illustrated in FIG. 7, the frequency to power consumption table T2 stores the power consumption of the CPU 101 for each frequency of the CPU 101. In the frequency to power consumption table T2 according to the present embodiment, a power consumption $p_{f1}$ is associated with a frequency $f_1$ and a power consumption $p_{f2}$ is associated with a frequency $f_2$.

(Power Saving State to Power Consumption Table T3)

FIG. 8 is a schematic diagram of a power saving state to power consumption table T3 according to the second embodiment.

As illustrated in FIG. 8, the power saving state to power consumption table T3 stores the power consumption of the CPU 101 for each power saving state S. In the power saving state to power consumption table T3 according to the present embodiment, a power consumption $p_{s1}$ is associated with an active standby state $S_1$ and a power consumption $p_{s2}$ is associated with a sleep state $S_2$.

[Transition Processing Flow]

Figure 9:
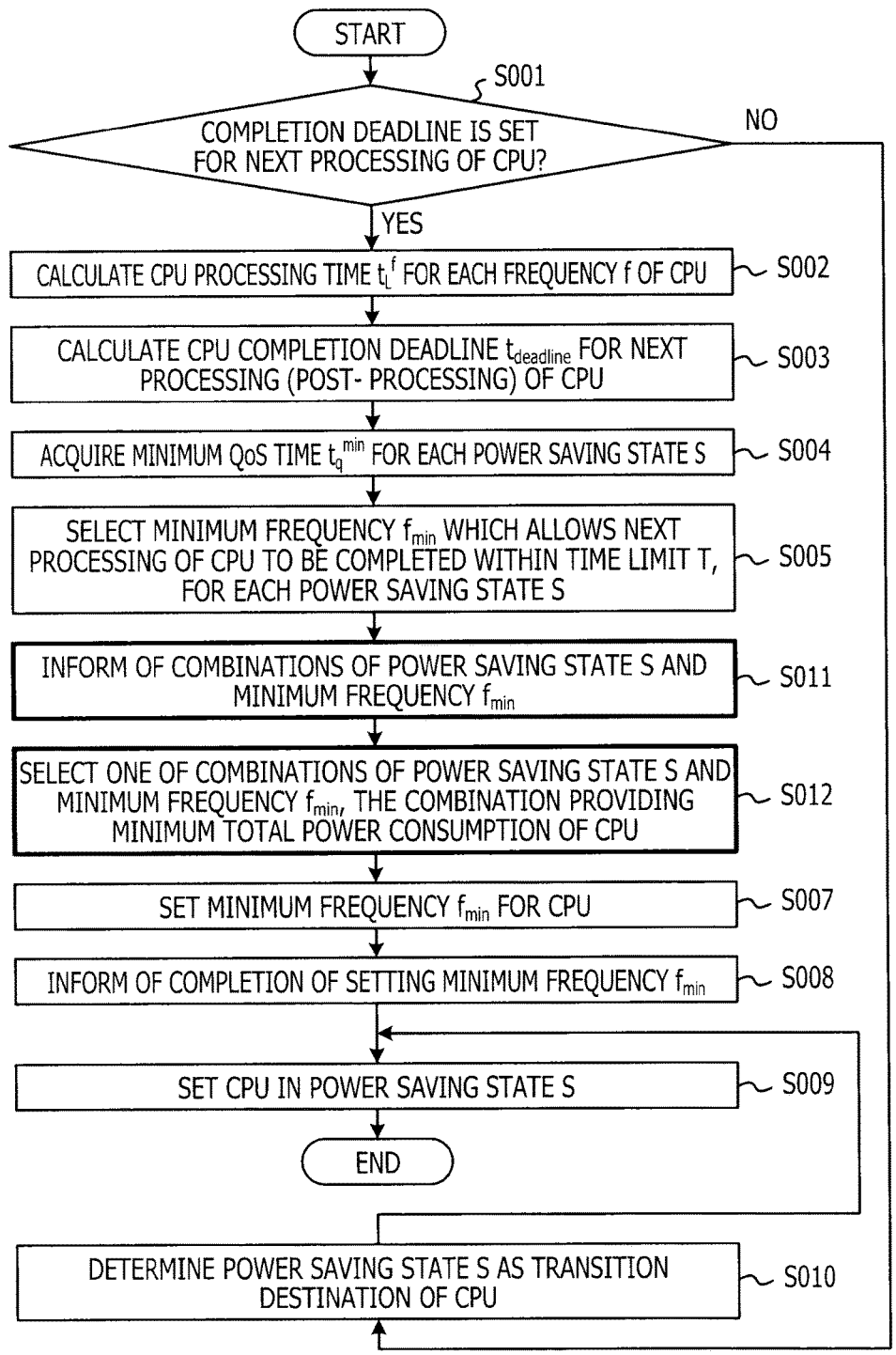
FIG. 9 is a flow chart for transition processing according to the second embodiment.

FIG. 9 is a flow chart for transition processing according to the second embodiment.

As illustrated in FIG. 9, after a minimum frequency $f_{min}$ is selected for each power saving state S (step S005), the frequency condition determination unit 209 informs the optimal frequency determination unit 210 of the combinations of the power saving state S and the minimum frequency $f_{min}$.

Next, the optimal frequency determination unit 210 selects one of the combinations of the power saving state S and the minimum frequency $f_{min}$ informed by the frequency condition determination unit 209, the combination providing a minimum total power consumption of the CPU 101. Specifically, the optimal frequency determination unit 210 according to the present embodiment selects a combination for which the power consumption by the CPU 101 in performing the next processing, that is, the power consumption during a CPU processing time $t_L^f$ and the power consumption during a set period $t_q^{min}$ of a power saving state has a minimum total.

Specifically, the optimal frequency determination unit 210 refers to the frequency to power consumption table T2 to acquire the power consumption $P_f$ which is associated with the frequency f of the CPU processing time $t_L^f$. Subsequently, the optimal frequency determination unit 210 calculates the amount of power consumption during the CPU processing time $t_L^f$ by multiplying the power consumption $P_f$ by the CPU processing time $t_L^f$. In addition, the frequency condition determination unit 205 refers to the power saving state to power consumption table T3 to acquire the power consumption $P_s$ which is associated with the power saving state S. Subsequently, the optimal frequency determination unit 210 calculates the amount of power consumption during a set period $t_q^{min}$ of the power saving state S by multiplying the power consumption $P_s$ by the set period $t_q^{min}$ of the power saving state S. Subsequently, the optimal frequency determination unit 210 selects a combination for which the power consumption during the CPU processing time $t_L^f$ and the power consumption during the set period $t_q^{min}$ of the power saving state S has a minimum total.

As described above, according to the present embodiment, a combination is selected for which the power consumption by the CPU 101 in performing the next processing, that is, the power consumption during a CPU processing time $t_L^f$ and the power consumption during a set period $t_q^{min}$ of a power saving state has a minimum total. Therefore, a combination of a power saving state S and a minimum frequency $f_{min}$, which provides a minimum total power consumption of the CPU 101, may be selected more accurately. Therefore, reduction in the power consumption of the CPU 101 may be achieved more reliably.

Third Embodiment

Hereinafter, a third embodiment will be described with reference to FIGS. 10 to 13. However, description of the same configurations, functions, operations as those in the first and second embodiments is omitted.

In the third embodiment, an information processing apparatus 100B is assumed to include so-called LINUX (registered trademark)-based CPUfreq and so-called boost mounted thereon, the LINUX-based CPUfreq being configured to dynamically change the frequency of the CPU 101 according to a utilization situation of the CPU 101, the boost being configured to change, upon occurrence of a designated event as a trigger, a lower limit, which is a parameter of CPUfreq, of the frequency of the CPU 101 to another lower limit, which is another parameter of CPUfreq, of the frequency of the CPU 101 and is maintained for a predetermined time only. Hereinafter, let the another parameter be a parameter of the boost.

The CPUfreq operates independently of the setting operation of a return frequency according to the first and second embodiments. Therefore, after return to an active state, the CPUfreq may operate to decrease a return frequency of the CPU 101. When the return frequency of the CPU 101 is decreased, the minimum QoS time $t_q^{min}$ is extended, and thus the next processing of the CPU 101 may not be completed within the time limit T.

Thus, in the present embodiment, the designated event for the boost is return of the CPU 101 to an active state. Furthermore, the lower limit, which is a parameter of the boost, of the frequency of the CPU 101 is set to be the return frequency or higher, and the operation period of the boost is set to be the minimum QoS time $t_q^{min}$ or longer.

Consequently, after return to an active state of the CPU 101, the boost operates for at least the minimum QoS time $t_q^{min}$, and thus the frequency of the CPU 101 is not decreased to the return frequency or lower.

In the present embodiment, although a LINUX-based CPUfreq has been exemplified, without being limited to the LINUX-based CPUfreq, any device that dynamically changes the frequency of the CPU 101 may be used.

[Functional Block of Information Processing Apparatus 100B]

Figure 10:
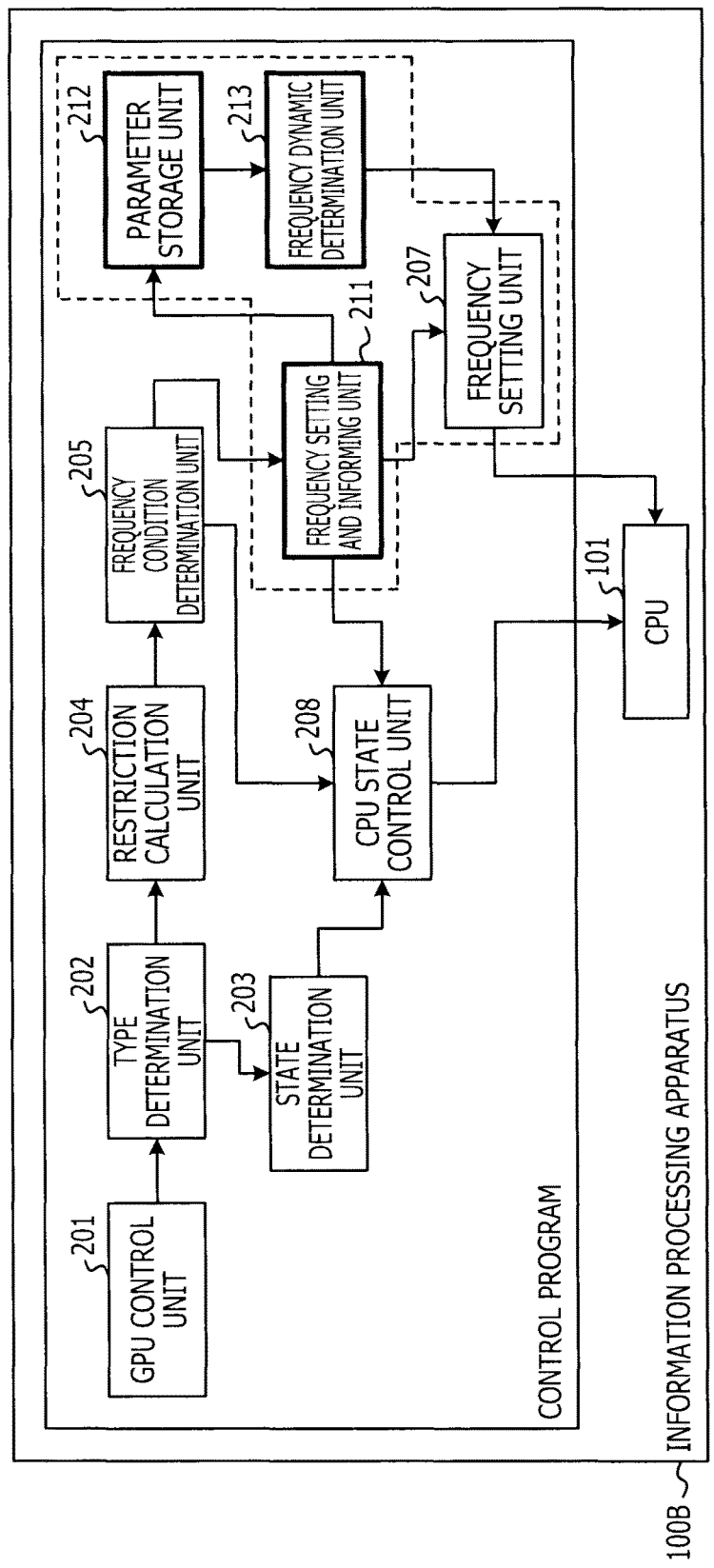
FIG. 10 is a schematic diagram of a functional block of an information processing apparatus according to a third embodiment.

FIG. 10 is a schematic diagram of a functional block of an information processing apparatus 100B according to the third embodiment.

As illustrated in FIG. 10, the information processing apparatus 100B according to the third embodiment includes a frequency setting informing unit 211 instead of the frequency setting informing unit 206 according to the first embodiment, and further includes a parameter storage unit 212 and a frequency dynamic determination unit 213.

The operation of each of the frequency setting informing unit 211, the parameter storage unit 212, and the frequency dynamic determination unit 213 is achieved by the CPU 101 that reads a control program in the main memory 102 and executes the control program read therein.

After return to an active state, the frequency setting informing unit 211 changes a lower limit of the frequency of the CPU 101 to a value which is higher than or equal to the return frequency to be used by the CPU 101 (the minimum frequency $f_{min}$), the lower limit being stored in the parameter storage unit 212 as a parameter of the boost. In the case where a plurality of parameters of the boost is stored in the parameter storage unit 212, the frequency setting informing unit 211 may select one of the parameters which is higher than or equal to the return frequency of the CPU 101.

The parameter storage unit 212 stores lower limits of the frequency of the CPU 101 as parameters of the boost.

According to a utilization situation of the CPU 101, the frequency dynamic determination unit 213 dynamically changes the frequency to be set in the frequency setting unit 207, that is, the frequency to be used by the CPU 101. Normally, the frequency dynamic determination unit 213 uses a lower limit of the frequency of the CPU 101, the lower limit serving as a parameter of the CPUfreq which has been set beforehand. Specifically, upon occurrence of the designated event as a trigger, the frequency dynamic determination unit 213 uses a lower limit of the frequency of CPU 101 for a predetermined time only, the lower limit being stored in the parameter storage unit 212 as a parameter of the boost.

[Detailed Functions of Frequency Dynamic Determination Unit 213]

Figure 11:
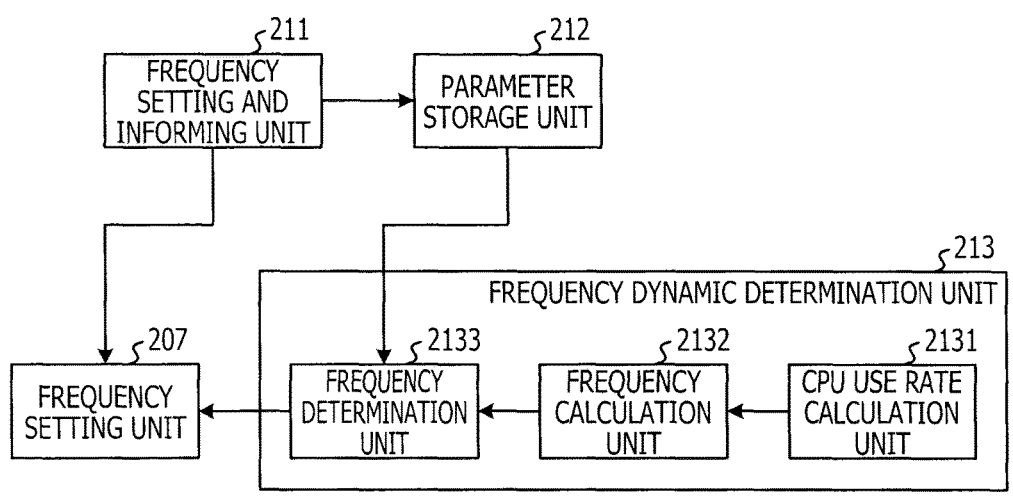
FIG. 11 is a schematic diagram of detailed functions of a frequency dynamic determination unit according to the third embodiment.

FIG. 11 is a schematic diagram of detailed functions of the frequency dynamic determination unit 213 according to the third embodiment. It is to be noted that FIG. 11 also illustrates the frequency setting informing unit 211, the parameter storage unit 212, and the frequency setting unit 207 in addition to the frequency dynamic determination unit 213.

As illustrated in FIG. 11, the frequency dynamic determination unit 213 includes a CPU use rate calculation unit 2131, a frequency calculation unit 2132, and a frequency determination unit 2133.

The CPU use rate calculation unit 2131 calculates a CPU use rate (CPU load) based on a utilization situation (such as statistical information) of the CPU 101. The CPU use rate is a rate of execution time of the CPU 101 in a unit time.

The frequency calculation unit 2132 calculates a candidate value for frequency to be used by the CPU 101 based on the latest CPU use rate, the current frequency of the CPU 101, and a use rate threshold value. Specifically, the frequency calculation unit 2132 determines whether or not the latest CPU use rate exceeds the use rate threshold value. When it is determined that the latest CPU use rate exceeds the use rate threshold value, the frequency calculation unit 2132 selects one of the frequencies usable by the CPU 101 as a candidate value for frequency to be used by the CPU 101, the candidate value being higher than the current frequency of the CPU 101.

The frequency determination unit 2133 sets in the frequency setting unit 207 a higher one of a candidate value for frequency to be used by the CPU 101 and a minimum value of the frequency of CPU 101 as a parameter of the boost.

[Transition Processing Flow]

Figure 12:
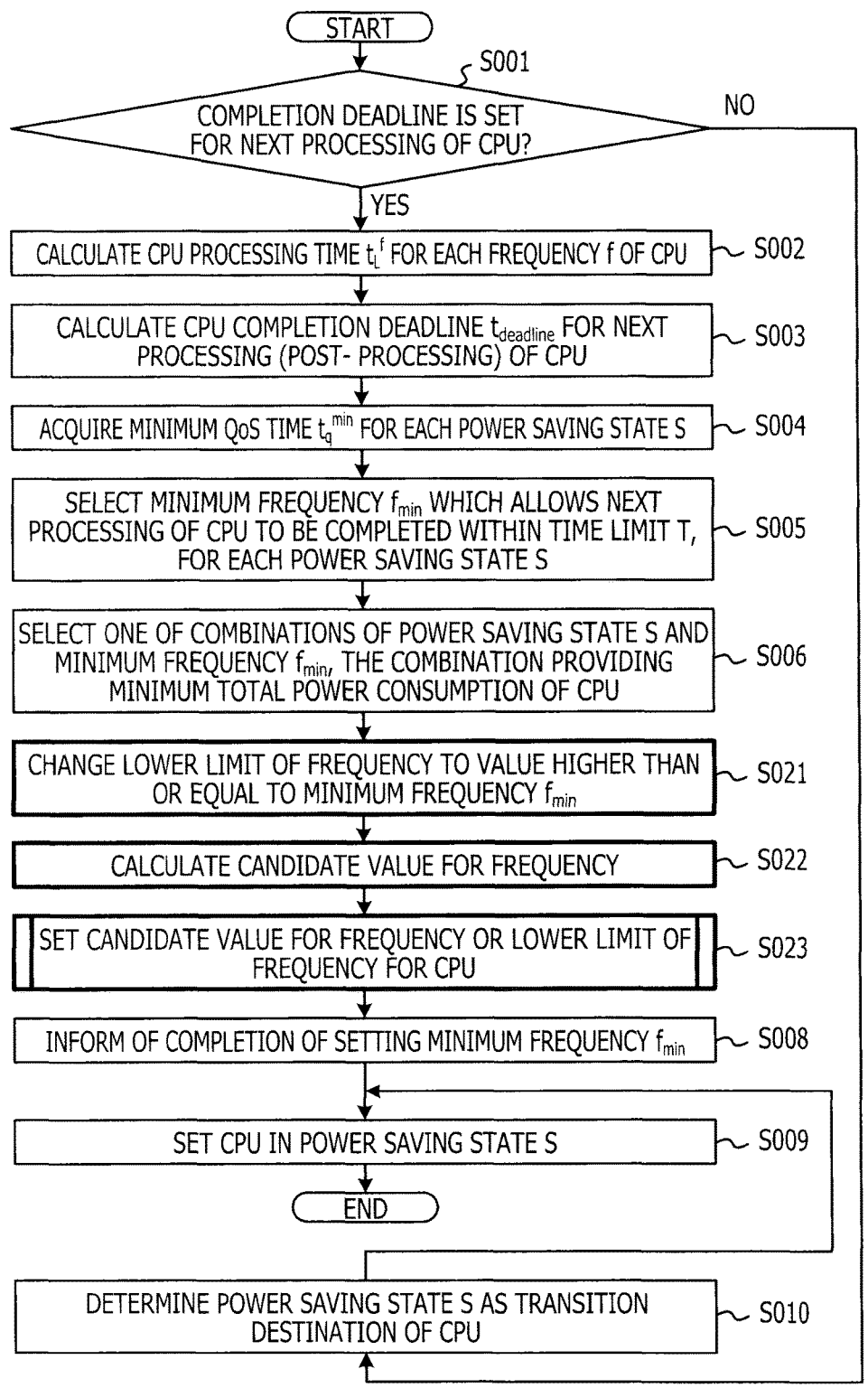
FIG. 12 is a flow chart for transition processing according to the third embodiment.

FIG. 12 is a flow chart for transition processing according to the third embodiment.

As illustrated in FIG. 12, after a combination of a power saving state S and a minimum frequency $f_{min}$ is selected, the combination providing a minimum total power consumption of the CPU 101 (step S006) and before completion of frequency setting is informed (step S008), the frequency setting informing unit 211 changes the lower limit of the frequency of the CPU 101 to a value higher than or equal to the minimum frequency $f_{min}$, the lower limit being stored in the parameter storage unit 212 as a parameter of the boost (step S021).

Next, the frequency dynamic determination unit 213 calculates the latest CPU use rate based on a utilization situation of the CPU 101, and determines a candidate value for frequency to be used by the CPU 101 based on the CPU use rate, the current frequency of the CPU 101, and the use rate threshold value (step S022).

Next, the frequency dynamic determination unit 213 sets the candidate value for frequency or the lower limit of the frequency for the CPU 101 (step S023). That is, the frequency dynamic determination unit 213 selects a frequency to be used by the CPU 101, the frequency being one of the candidate value for frequency and the lower limit of the frequency. Specifically, the frequency dynamic determination unit 213 sets in the frequency setting unit 207 a higher one of the candidate value for frequency and the lower limit of the frequency. When the lower limit of the frequency rather than the candidate value for frequency is set for the CPU 101, the time period during which the frequency is maintained may be longer than or equal to the CPU processing time $t_L^f$.

[Details of Setting Operation of Frequency]

Figure 13:
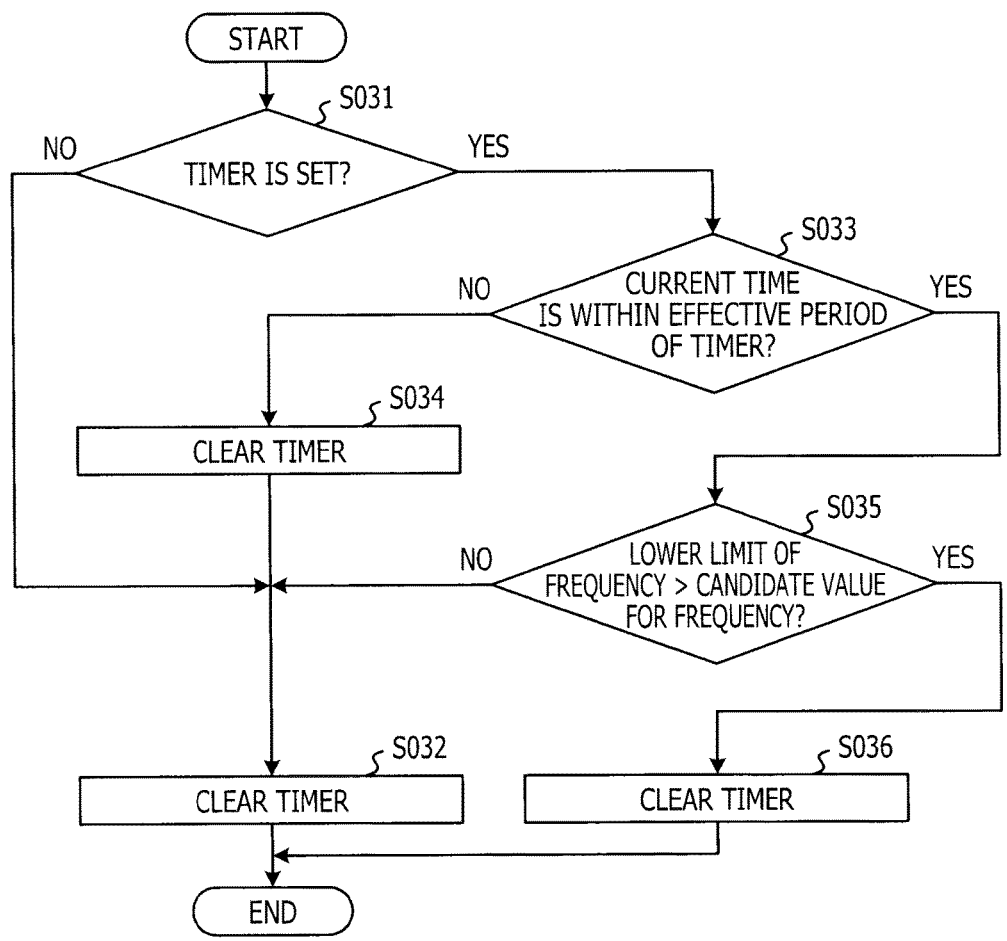
FIG. 13 is a detailed flow chart for frequency setting according to the third embodiment.

FIG. 13 is a detailed flow chart for frequency setting according to the third embodiment.

As illustrated in FIG. 13, the frequency dynamic determination unit 213 determines whether or not a timer is set (step S031).

When it is determined that the timer has not been set (No in step S031), the frequency dynamic determination unit 213 sets in the frequency setting unit 207 a candidate value for frequency as the frequency to be used by the CPU 101 (step S032).

On the other hand, when it is determined that the timer has been set (Yes in step S031), the frequency dynamic determination unit 213 determines whether or not the current time is within the effective period of the timer (step S033).

When the current time is determined to be not within the effective period of the timer (No in step S033), the frequency dynamic determination unit 213 clears the timer (step S034), and sets in the frequency setting unit 207 the candidate value for frequency as the frequency to be used by the CPU 101 (step S032).

On the other hand, when the current time is determined to be within the effective period of the timer (Yes in step S033), the frequency dynamic determination unit 213 determines whether or not the lower limit of the frequency as a parameter of the boost is higher than the candidate value for frequency (step S035).

When the lower limit of the frequency is determined to be not higher than the candidate value for frequency (No in step S035), the frequency dynamic determination unit 213 sets in the frequency setting unit 207 the candidate value for frequency as the frequency to be used by the CPU 101 (step S032).

On the other hand, when the lower limit of frequency is determined to be higher than the candidate value for frequency (Yes in step 035), the frequency dynamic determination unit 213 outputs the lower limit of the frequency to the frequency setting unit 207 as the frequency to be used by the CPU 101 (step S036). Therefore, the CPU 101 operates with the lower limit of the frequency as a parameter of the boost until the expiration of the effective period of the timer.

As described above, according to the present embodiment, the designated event of the boost is return to an active state from a power saving state, and the lower limit of the frequency of the CPU 101 stored in the parameter storage unit 212 as a parameter of the boost is higher than or equal to the return frequency (minimum frequency $f_{min}$) which is set in the frequency setting unit 207.

Therefore, after return to an active state of the CPU 101, the frequency of the CPU 101 is never lower than or equal to the minimum frequency $f_{min}$ irrespective of the utilization situation of the CPU 101. That is, it is possible to set the frequency of CPU 101 after return to an active state higher than or equal to the minimum frequency $f_{min}$ reliably. Therefore, the next processing of the CPU 101 may be reliably completed by the completion deadline.

Fourth Embodiment

Hereinafter, an fourth embodiment will be described with reference to FIGS. 14 and 15. However, description of the same configurations, functions, operations as those in the third embodiments is omitted.

In the third embodiment, the frequency of the CPU 101 is inhibited from decreasing to the return frequency or lower by changing a lower limit of the frequency of the CPU 101 as a parameter of the boost and maintaining the changed lower limit for a predetermined time set beforehand.

On the other hand, in the fourth embodiment, a lower limit of the frequency of the CPU 101, which is a parameter of the CPUfreq and not a parameter of the boost is changed.

It is to be noted that a lower limit of the frequency of the CPU 101 as a parameter of the CPUfreq is not automatically changed back after a predetermined time. Thus, in the present embodiment, after an elapse of a predetermined time since return to an active state of the CPU 101, a lower limit of the frequency of the CPU 101 as a parameter of the CPUfreq will be changed back.

[Functional Block of Information Processing Apparatus 100C]

Figure 14:
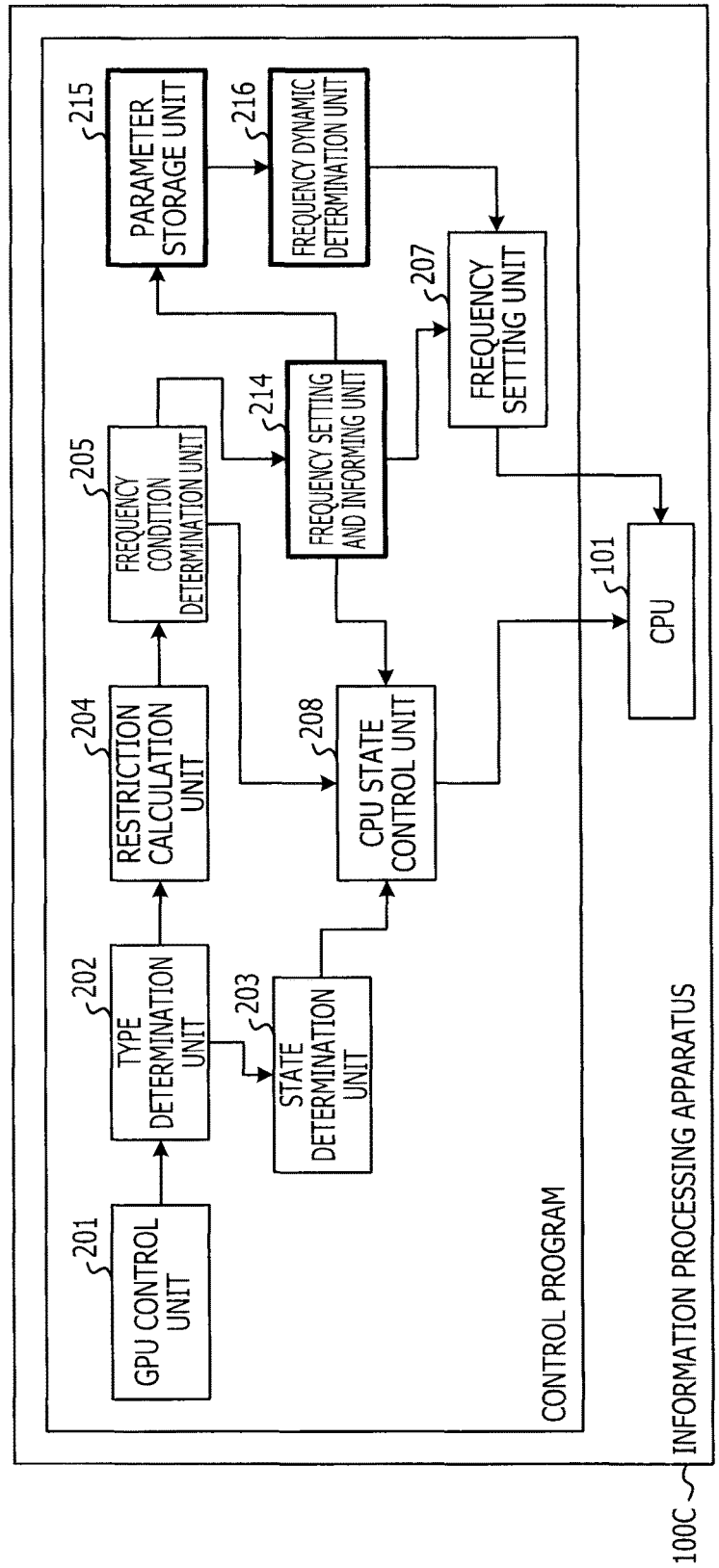
FIG. 14 is a schematic diagram of a functional block of an information processing apparatus according to a fourth embodiment.

FIG. 14 is a schematic diagram of a functional block of an information processing apparatus 100C according to the fourth embodiment.

As illustrated in FIG. 14, the information processing apparatus 100C according to the present embodiment includes a frequency setting informing unit 214, a parameter storage unit 215, and a frequency dynamic determination unit 216 instead of the frequency setting informing unit 211, the parameter storage unit 212, and the frequency dynamic determination unit 213 according to the third embodiment.

The operation of each of the frequency setting informing unit 214, the parameter storage unit 215, and the frequency dynamic determination unit 216 is achieved by the CPU 101 that reads a control program in the main memory 102 and executes the control program read therein.

The frequency setting informing unit 214 changes a lower limit of the frequency of the CPU 101 to a value which is higher than or equal to the return frequency (the minimum frequency $f_{min}$), the lower limit being stored in the parameter storage unit 215 as a parameter of the CPUfreq.

The parameter storage unit 215 stores lower limits of the frequency of the CPU 101 which are parameters of the CPUfreq.

The frequency dynamic determination unit 216 calculates a frequency of the CPU 101 based on a utilization situation of the CPU 101. At this point, the frequency dynamic determination unit 216 uses a lower limit of the frequency of the CPU 101 which is stored in the parameter storage unit 215 as a parameter of the CPUfreq.

[Transition Processing Flow]

Figure 15:
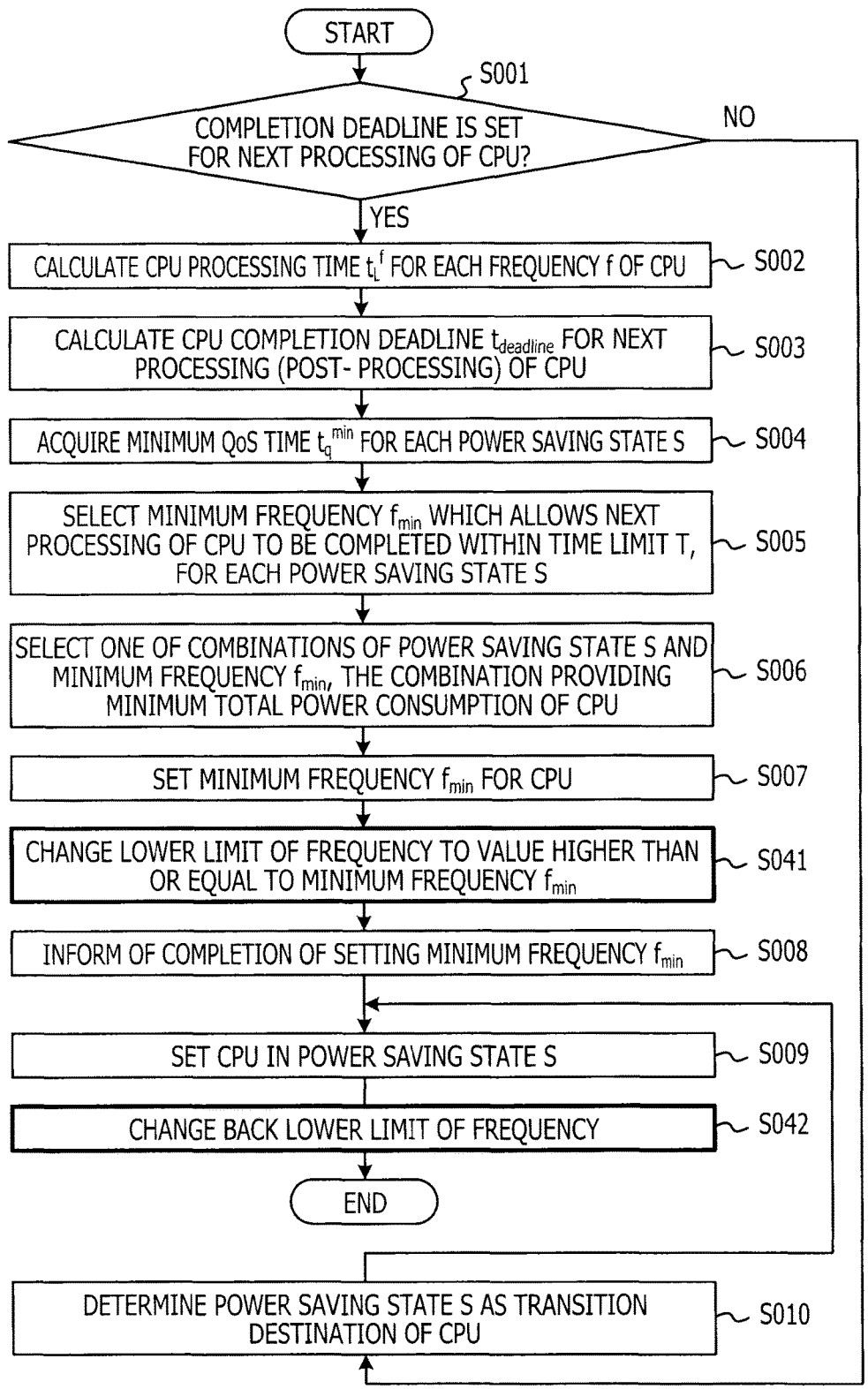
FIG. 15 is a flow chart for transition processing according to the fourth embodiment.

FIG. 15 is a flow chart for transition processing according to the fourth embodiment.

As illustrated in FIG. 15, after setting for the CPU 101 the minimum frequency $f_{min}$ from the frequency condition determination unit 205 (step S007) and before informing of completion of frequency setting (step S008), the frequency setting informing unit 214 changes a lower limit of the frequency of the CPU 101 to a value which is higher than or equal to the return frequency (the minimum frequency $f_{min}$), the lower limit being stored in the parameter storage unit 215 as a parameter of the CPUfreq (step S041).

Furthermore, after the CPU 101 is set in the power saving state S selected by the frequency condition determination unit 205 (step S009), the frequency setting informing unit 214 changes a lower limit of the frequency of the CPU 101 as a parameter of the CPUfreq back to the original value after an elapse of a predetermined time (step S042).

In this manner, although a parameter of the CPUfreq is changed, the parameter is changed back to the original value after an elapse of a predetermined time in the present embodiment, and thus normal CPUfreq resumes.

Although the frequency setting informing unit 214 according to the present embodiment reduces a decrease in the return frequency due to the CPUfreq by changing the parameter of the CPUfreq, the present disclosure is not limited to this. For example, the frequency setting informing unit 214 may reduce a decrease in the return frequency due to the CPUfreq by switching "IO is busy" flag ON. It is to be noted that when the "IO is busy" flag is set ON, the CPU use rate referred by the CPUfreq may be apparently increased, and thus it is possible to make a decrease in the frequency of the CPU 101 unlikely to occur. Similarly to the parameter of the CPUfreq, the "IO is busy" flag may be changed from ON to OFF after an elapse of a predetermined time.

Fifth Embodiment

A fifth embodiment will be described with reference to FIGS. 16 and 17. However, description of the same configurations, functions, operations as those in the first embodiment is omitted.

In the first embodiment, after setting of a minimum frequency $f_{min}$, the CPU 101 is caused to make a transition to a power saving state. On the other hand, in the fifth embodiment, an interrupt signal from the GPU 104 triggers a minimum frequency $f_{min}$ to be set for the CPU 101. That is, during a set period of a power saving state S, the frequency of the CPU 101 remains as was before a transition to a power saving state.

[Functional Block and Additional Hardware Configuration of Information Processing Apparatus 100D]

Figure 16:
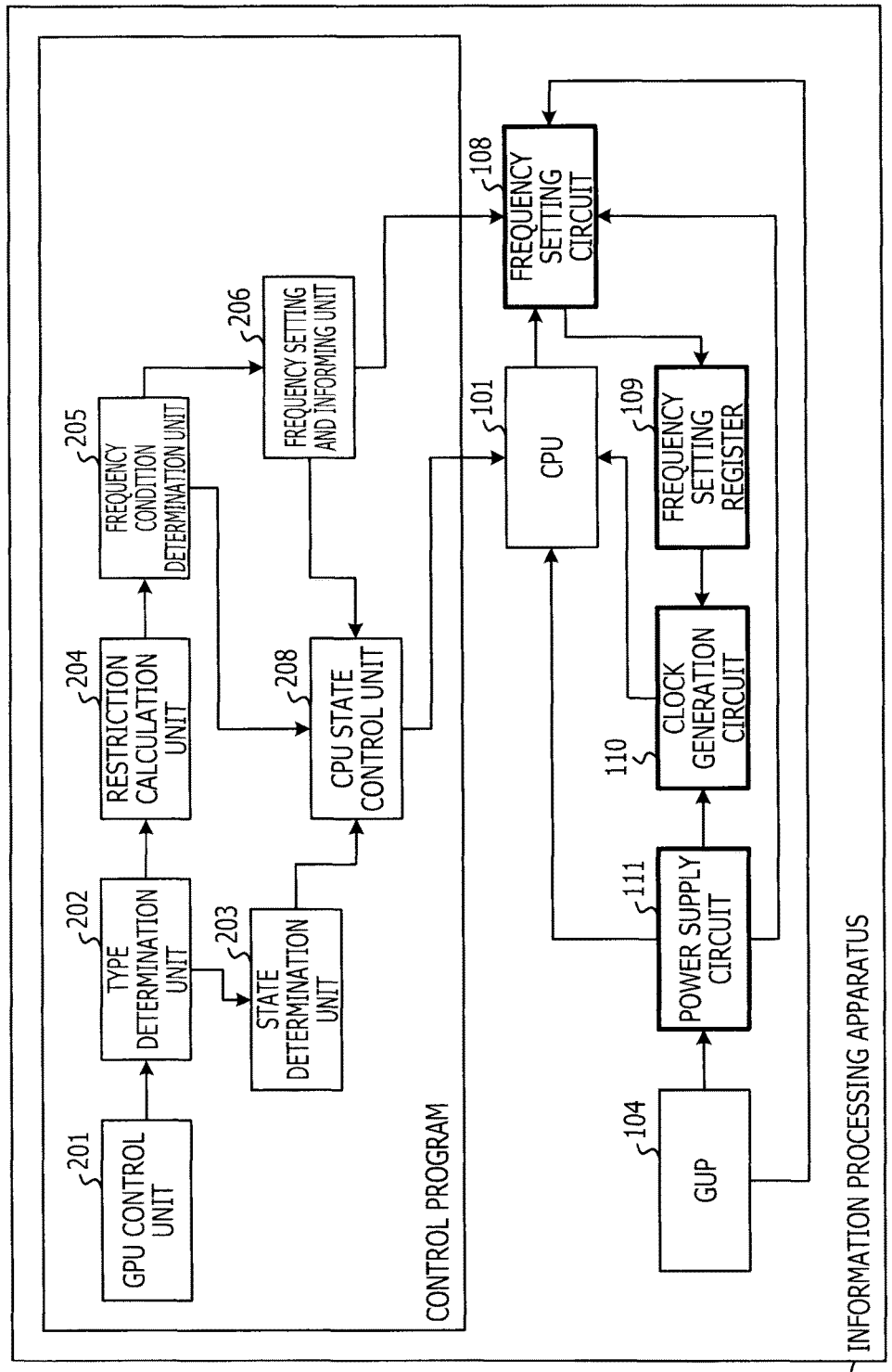
FIG. 16 is a schematic diagram of a functional block and an additional hardware configuration of an information processing apparatus according to a fifth embodiment.

FIG. 16 is a schematic diagram of a functional block and an additional hardware configuration of an information processing apparatus 100D according to the fifth embodiment.

As illustrated in FIG. 16, the information processing apparatus 100D according to the fifth embodiment includes a frequency setting circuit 108 instead of the frequency setting unit 207 of the information processing apparatus 100 according to the first embodiment, and further includes a frequency setting register 109, a clock generation circuit 110, and a power supply circuit 111. The frequency setting circuit 108, the frequency setting register 109, the clock generation circuit 110, and the power supply circuit 111 are hardware modules and interconnected via the bus 107.

The frequency setting circuit 108 stores a minimum frequency $f_{min}$ from the frequency setting informing unit 206 as a return frequency of the CPU 101 according to a command from the CPU 101.

The frequency setting register 109 holds a frequency which has been stored in the frequency setting circuit 108.

The clock generation circuit 110 generates a clock signal based on the frequency held in the frequency setting register 109 and supplies the clock signal to the CPU 101.

The power supply circuit 111 supplies power to the clock generation circuit 110 based on an interrupt signal from the GPU 104.

[Setting of Frequency]

Figure 17:
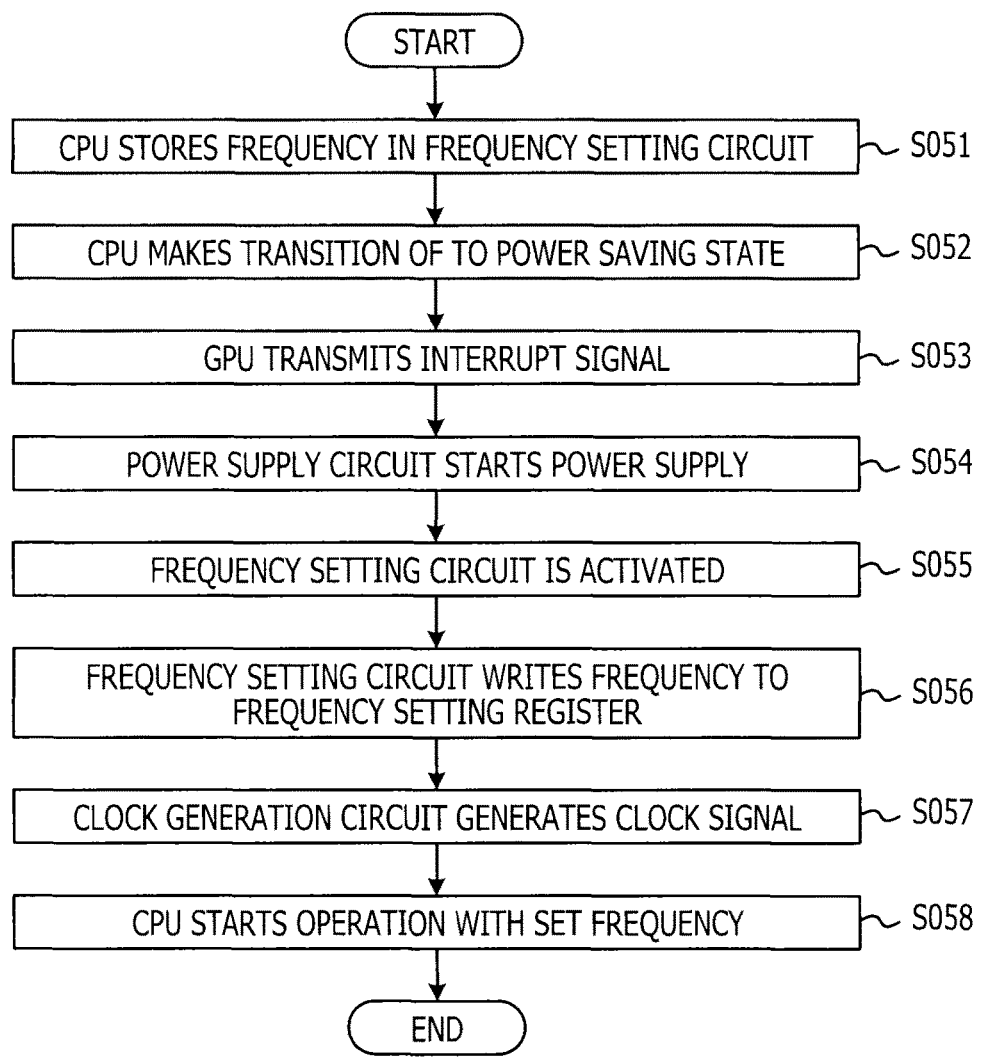
FIG. 17 is a flow chart for frequency setting according to the fifth embodiment.

FIG. 17 is a flow chart for frequency setting according to the fifth embodiment.

In the present embodiment, it is assumed that the return frequency is higher than the frequency of the CPU 101 before a transition is made to a power saving state.

As illustrated in FIG. 17, before a transition is made to a power saving state S, the CPU 101 stores the frequency, which has been determined as the return frequency, in the frequency setting circuit 108 (step S051).

Next, the CPU 101 makes a transition from an active state to a power saving state S (step S052).

Next, the GPU 104 transmits an interrupt signal to the power supply circuit 111 (step S053). The power supply circuit 111 and the frequency setting circuit 108 are informed of the interrupt signal.

Next, the power supply circuit 111 starts power supply according to the interrupt signal from the GPU 104 (step S054).

Next, the frequency setting circuit 108 is activated based on the power supply from the power supply circuit 111 (step S055).

Next, the frequency setting circuit 108 writes a frequency (return frequency) in the frequency setting register 109, the frequency being stored in the frequency setting circuit 108 (step S056).

Next, the clock generation circuit 110 reads the frequency written in the frequency setting register 109, and generates a clock signal based on the frequency (step S057).

Next, the CPU 101 starts its operation based on the clock signal from the clock generation circuit 110 and power supplied from the power supply circuit 111 (step S058). That is, the CPU 101 starts the operation with a return frequency after going through the above steps.

As described above, according to the present embodiment, the CPU 101 stores a frequency in the frequency setting circuit 108 before making a transition to a power saving state, and sets the frequency for the CPU 101 when returning to an active state, the frequency being stored in the frequency setting circuit 108. Therefore, during a set period of a power saving state, it is possible to maintain the frequency of the CPU 101 at the frequency before a transition to a power saving state.

Normally, when the frequency of the CPU 101 is increased, the frequency of the bus 107 such as Inter-Integrated Circuit (I2C), Serial Peripheral Interface (SPI) is also increased, and thus the power consumption resulting from the operation of the bus 107 will increase. In the case where the CPU 101 and a peripheral circuit are combined into a single chip by System On Chip (SoC) integration, when the frequency of the CPU 101 is increased, the power consumption of the entire chip will increase. When the frequency of the CPU 101 is further increased, the voltage for power supply to the chip increases, and in this situation, the power consumption of the entire chip will further increase.

However, in the present embodiment, during a set period of a power saving state, the frequency of the CPU 101 is not increased, and thus the power consumption resulting from the operation of the bus 107 does not increase. Consequently, the total power consumption of the information processing apparatus including the power consumption during a set period of a power saving state may be further reduced.

Although the GPU 104 has been exemplified in the first to fifth embodiments, the present disclosure is not limited to this. Any device, for example, a timer may be used as long as the device generates an interrupt signal for causing the CPU 101 to return to an active state from a power saving state. In the case of the GPU 104, for example, drawing processing may be presumed and in the case of a timer, scheduling for a process may be presumed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method using a processor, the processor being configured to execute a first data processing and a second data processing after the first data processing, and to be in a power saving mode selected from a plurality of power saving modes in a time period between the first data processing and the second data processing, a power consumption in the power saving mode being lower than a power consumption in the first data processing and a power consumption in the second data processing, the method comprising:

executing, by the processor, the first data processing;

determining, before the processor is in the power saving mode, a plurality of combinations of a first mode included in the plurality of the power saving modes as the power saving mode in the time period and a first operational frequency included in an operational frequency range of the processor as an operational frequency of the processor in the second data processing based on a completion deadline of the second data processing and an amount of data processing in the second data processing;
calculating, before the processor is in the power saving mode, for each of the specified plurality of combinations, a total power consumption of a first power consumption consumed by the processor in the first mode in the time period and a second power consumption consumed by the processor using the first operational frequency in the second data processing;
selecting, before the processor is in the power saving mode, based on the total power consumption of the first power consumption and the second power consumption, one combination of the first mode and the first frequency from the plurality of combinations so that the total power consumption becomes minimum value;
controlling, after the first data processing is completed by the processor, the processor in the selected first mode; and
executing, after the controlling of the processor in the selected first mode, the second data processing using the processor that operates with the selected first operational frequency.

2. The method of controlling a processor according to claim 1, the method further comprising:
calculating a first execution period of the second data processing based on the first operational frequency.

3. The method of controlling a processor according to claim 1, wherein the determining of the first operational frequency is performed after the first processing is completed and before the processor is controlled in the first mode.

4. The method of controlling a processor according to claim 1, further comprising:
changing a lower limit of the operational frequency range of the processor to a value higher than or equal to the first operational frequency when the first operational frequency is higher than a frequency of the processor in the first data processing.

5. The method of controlling a processor according to claim 1, further comprising:
changing a parameter related to a frequency of the processor to prevent a decrease in the first operational frequency when the first operational frequency is higher than the frequency of the processor in the first data processing.

6. An information processing apparatus configured to execute a first data processing and a second data processing after the first data processing, and to be in a power saving mode selected from a plurality of power saving modes in a time period between the first data processing and the second data processing, a power consumption in the power saving mode being lower than a power consumption in the first data processing and a power consumption in the second data processing, the information processing apparatus comprising:
a memory; and
a processor coupled to the memory and configured to
execute the first data processing;
determine, before entering the power saving mode, a plurality of combinations of a first mode included in the plurality of the power saving modes as the power saving mode in the time period and a first operational frequency included in an operational frequency range of the processor as an operational frequency of the processor in the second data processing based on a completion deadline of the second data processing and an amount of data processing in the second data processing;
calculate, before the processor is in the power saving mode, for each of the specified plurality of combinations, a total power consumption of a first power consumption consumed by the processor in the first mode in the time period and a second power consumption consumed by the processor using the first operational frequency in the second data processing;
select, before the processor is in the power saving mode, based on the total power consumption of the first power consumption and the second power consumption, a combination of the first mode and the first frequency from the plurality of combinations so that the total power consumption becomes minimum value;
control, after the first data processing is completed by the processor, the processor in the selected first mode; and
execute, after the controlling of the processor in the selected first mode, the second data processing using the processor that operates with the selected first operational frequency.

7. The information processing apparatus according to claim 6, wherein the processor is configured to
calculate a first execution period of the second data processing based on the first operational frequency.

8. The information processing apparatus according to claim 6, wherein the processor is configured to determine the first operational frequency after the first processing is completed and before the processor is controlled in the first mode.

9. The information processing apparatus according to claim 6, wherein the processor is configured to change a lower limit of the operational frequency range of the processor to a value higher than or equal to the first operational frequency when the first operational frequency is higher than a frequency of the processor in the first data processing.

10. The information processing apparatus according to claim 6, wherein the processor is configured to change a parameter related to a frequency of the processor to prevent a decrease in the first operational frequency when the first operational frequency is higher than the frequency of the processor in the first data processing.

11. A non-transitory computer-readable storage medium storing a program that causes a processor of an information processing apparatus to execute a process, the processor being configured to execute a first data processing and a second data processing after the first data processing and to be in a power saving mode selected from a plurality of power saving modes in a time period between the first data processing and the second data processing, a power consumption in the power saving mode being lower than a power consumption in the first data processing and a power consumption in the second data processing, the process comprising:
executing the first data processing;
determining, before the processor is in the power saving mode, a plurality of combinations of a first mode included in the plurality of the power saving modes as the power saving mode in the time period and a first operational frequency included in an operational frequency range of the processor as an operational frequency of the processor in the second data processing based on a completion deadline of the second data processing and an amount of data processing in the second data processing;

calculating, before the processor is in the power saving mode, for each of the specified plurality of combinations, a total power consumption of a first power consumption consumed by the processor in the first mode in the time period and a second power consumption consumed by the processor using the first operational frequency in the second data processing;

selecting, before the processor is in the power saving mode, based on the total power consumption of the first power consumption and the second power consumption, a combination of the first mode and the first frequency from the plurality of combinations so that the total power consumption becomes minimum value;

controlling, after the first data processing is completed by the processor, the processor in the selected first mode; and executing, after the controlling of the processor in the selected first mode the second data processing using the processor that operates with the selected first operational frequency.

12. The non-transitory computer-readable storage medium according to claim 11, wherein the process further comprising:
calculating a first execution period of the second data processing based on the first operational frequency.

13. The non-transitory computer-readable storage medium according to claim 11, wherein the determining of the first operational frequency is performed after the first processing is completed and before the processor is controlled in the first mode.

14. The non-transitory computer-readable storage medium according to claim 11, wherein the process further comprising:
changing a lower limit of the first operational frequency range of the processor to a value higher than or equal to the first operational frequency when the operational frequency is higher than a frequency of the processor in the first data processing.

15. The method of controlling a processor according to claim 1, the method further comprising:
determining, before the processor is in the power saving mode, the completion deadline of the second data processing and an amount of data processing in the second data processing.

16. The method of controlling a processor according to claim 15, wherein
the selecting of the combination of the first mode and the first frequency is executed so that the second data processing completes before the completion deadline.

17. The information processing apparatus according to claim 6, wherein the processor is configured to
determine, before the processor is in the power saving mode, the completion deadline of the second data processing and an amount of data processing in the second data processing.

18. The information processing apparatus according to claim 17, wherein the processor is configured to
select the combination of the first mode and the first frequency so that the second data processing completes before the completion deadline.

19. The non-transitory computer-readable storage medium according to claim 11, the process further comprising:
determining, before the processor is in the power saving mode, the completion deadline of the second data processing and an amount of data processing in the second data processing.

20. The non-transitory computer-readable storage medium according to claim 19, wherein
the selecting of the combination of the first mode and the first frequency is executed so that the second data processing completes before the completion deadline.

* * * * *